(No Model.) 2 Sheets—Sheet 1.

T. N. SUBERS.
ANTI-FRICTION JOURNAL.

No. 438,902. Patented Oct. 21, 1890.

Witnesses:
R. Schleicher
Murray C. Boyer

Inventor:
Thomas N. Subers
by his Attorneys
Howson & Howson (No Model.) 2 Sheets—Sheet 2.

T. N. SUBERS.
ANTI-FRICTION JOURNAL.

No. 438,902. Patented Oct. 21, 1890.

Witnesses:
R. Schlecher
Murray C. Boyer

Inventor:
Thomas N. Subers
by his Attorneys
Howson & Howson

UNITED STATES PATENT OFFICE.

THOMAS N. SUBERS, OF PHILADELPHIA, PENNSYLVANIA, ASSIGNOR OF ONE-HALF TO JACOB G. SHARP, OF SAME PLACE.

ANTI-FRICTION JOURNAL.

SPECIFICATION forming part of Letters Patent No. 438,902, dated October 21, 1890.

Application filed May 1, 1890. Serial No. 350,181. (No model.)

*To all whom it may concern:*

Be it known that I, THOMAS N. SUBERS, a citizen of the United States, and a resident of Philadelphia, Pennsylvania, have invented certain Improvements in Anti-Friction Journals, of which the following is a specification.

The object of my invention is to so construct an anti-friction journal-box for axles or shafts as to provide a roller-bearing throughout; and this object I attain in the manner hereinafter set forth, reference being had to the accompanying drawings, in which—

Figure 1:
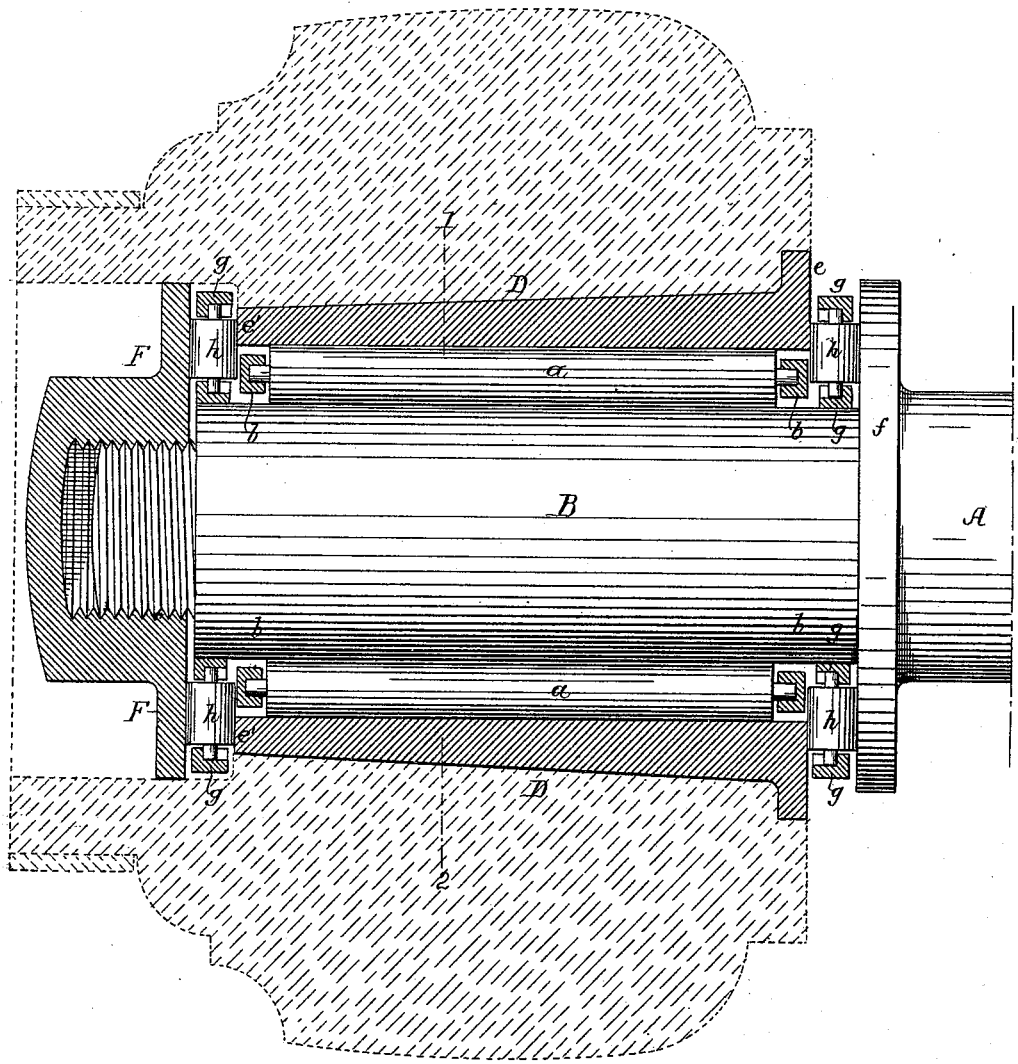
Figure 2:
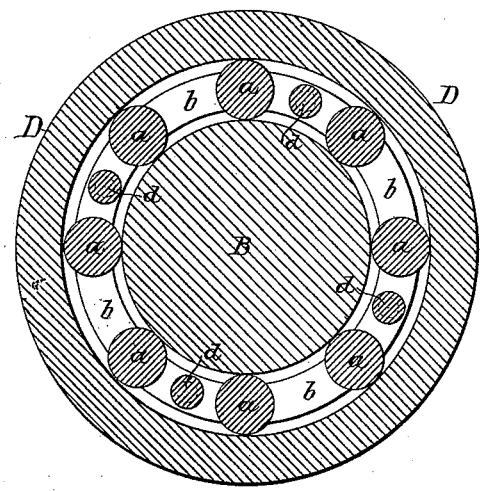
Figure 3:
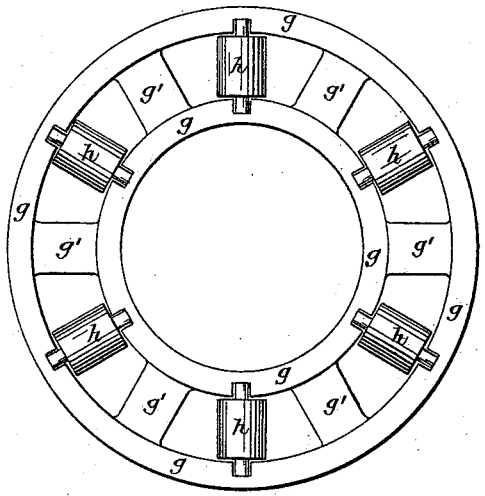
Figure 4:
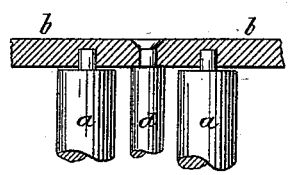

Figure 1 is a longitudinal section of part of the wheel and axle of a vehicle with journal-box and anti-friction bearing therefor constructed in accordance with my invention. Fig. 2 is a section on the line 1 2, Fig. 1. Fig. 3 is a side elevation of one of the anti-friction washers forming part of the bearing, and Fig. 4 is a sectional view of another element of the bearing.

A represents part of the axle of a vehicle; B, the journal of the same, and D the journal-box, secured to the hub of the wheel. The main bearing of the journal-box upon the journal is formed by a series of anti-friction rollers $a$, the journals of which are adapted to recesses in suitable end frames $b$, the latter being connected at intervals by bolts or stays $d$, so as to preserve their proper relation to each other.

Between the inner flanged end $e$ of the journal-box and the usual collar $f$ at the inner end of the journal is interposed a washer composed of inner and outer rings $g$, connected by stays $g'$ at proper intervals, and to recesses in these rings $g$ are adapted the journals of a series of anti-friction rollers $h$, which project laterally in both directions beyond the rings, so as to serve by contact with the flange $e$ and collar $f$ as bearings for the inner end of the journal-box. A similar washer with anti-friction rollers is interposed between the outer end $e'$ of the journal-box and the retaining-nut F, which is adapted to the threaded outer end of the journal. The rollers $h$ of the end washers of the bearing project radially inward beyond the bore of the journal-box and serve as bearings for the end-rings $b$ of the frame carrying the rollers $a$, so as to prevent contact of said rings with the flange and nut at the ends of the journal. By this means roller-bearings are presented throughout. Consequently the movement of the journal-box is effected with the minimum of friction. The journals of the rollers $h$ simply rest in bearings in the rings $g$, although in some cases the bearings may be capped after the insertion of the rollers, so as to confine the journals and prevent the escape of the rollers from the washer when the latter is removed from the axle.

I am aware that washers carrying balls have been heretofore used as anti-friction bearings at the ends of a journal-box; but a ball is not effective as an anti-friction device when interposed between flat bearing-surfaces, as it has a tendency to form a recess or groove in these surfaces and embed itself therein; and such a device is not, moreover, capable of constituting a roller-bearing for the rings of the main roller-frame. In my bearing, therefore, I use the flat-faced rollers at the ends of the journal-box, in order to provide an extended bearing and prevent the wearing away or grooving of parts, as well as to present a roller-bearing for the end rings of the central frame. The rollers may, if desired, be slightly flared from the inner to the outer ends to accord with the difference in diameter of the bearing at these points; but I have found in practice that such flaring of the rollers is not absolutely essential.

Although my invention is shown as applied to the journal of a vehicle, it may be used in journal or shaft bearings generally, and a flange-collar or other projection on the shaft or axle may in many cases replace the nut F, and the projections at the ends of the journal may in some instances carry the rollers $h$.

Having thus described my invention, I claim and desire to secure by Letters Patent—

1. The combination of the shaft or axle having a journal, a journal-box, a frame carrying rollers interposed between said box and the journal, and rollers mounted in bearings at the ends of the journal-box and serving as bearings both for said ends of the box and for the ends of the central roller-carrying frame, the ends of both box and frame being in direct contact with the said rollers, substantially as specified.

2. The combination of the shaft or axle having a journal with projecting portions at opposite ends, a journal-box, a frame carrying rollers interposed between said box and the journal, and washers interposed between the ends of the journal-box and the projections on the journal, and serving as bearings both for the ends of the journal-box and for the ends of the central roller-carrying frame, the ends of both the journal-box and the frame being in direct contact with said rollers, substantially as specified.

In testimony whereof I have signed my name to this specification in the presence of two subscribing witnesses.

THOMAS N. SUBERS.

Witnesses:
  EUGENE ELTERICH,
  HARRY SMITH.